US007672943B2

United States Patent
Wong et al.

(10) Patent No.: US 7,672,943 B2
(45) Date of Patent: Mar. 2, 2010

(54) CALCULATING A DOWNLOADING PRIORITY FOR THE UNIFORM RESOURCE LOCATOR IN RESPONSE TO THE DOMAIN DENSITY SCORE, THE ANCHOR TEXT SCORE, THE URL STRING SCORE, THE CATEGORY NEED SCORE, AND THE LINK PROXIMITY SCORE FOR TARGETED WEB CRAWLING

(75) Inventors: Sandy Wong, Bellevue, WA (US); Yet L. Huynh, Seattle, WA (US); Ramakrishnan Natarajan, Redmond, WA (US); Joon Young Kim, Snohomish, WA (US); Michael D. Thogersen, Seattle, WA (US); Tong Yao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 11/586,779

(22) Filed: Oct. 26, 2006

(65) Prior Publication Data
US 2008/0104113 A1 May 1, 2008

(51) Int. Cl.
*G06F 17/30* (2006.01)
*G06F 17/00* (2006.01)
*G06F 15/16* (2006.01)

(52) U.S. Cl. .............. 707/7; 707/5; 707/10; 707/102; 707/104.1; 709/218; 715/206

(58) Field of Classification Search ................. 707/1–3, 707/5–7, 10, 100, 102, 104.1, 200; 709/220–225, 709/218–219; 715/733, 808, 839, 854, 205–206; 706/45–50
See application file for complete search history.

(56) References Cited

U.S. PATENT DOCUMENTS 6,285,999 B1 * 9/2001 Page ............................. 707/5

(Continued)

FOREIGN PATENT DOCUMENTS

WO     WO 0101220     1/2001

(Continued)

OTHER PUBLICATIONS

Sandeep Pandey et al. "UserCentric Web Crawling",WWW 2005, May 1014, 2005, Chiba, Japan, ACM 1595930469, 05/0005, pp. 401-411.*

(Continued)

*Primary Examiner*—Srirama Channavajjala

(57) ABSTRACT

A web crawler system as described herein utilizes a targeted approach to increase the likelihood of downloading web pages of a desired type or category. The system employs a plurality of URL scoring metrics that generate individual scores for outlinked URLs contained in a downloaded web page. For each outlinked URL, the individual scores are combined using an appropriate algorithm or formula to generate an overall score that represents a downloading priority for the outlinked URL. The web crawler application can then download subsequent web pages in an order that is influenced by the downloading priorities.

10 Claims, 3 Drawing Sheets

U.S. PATENT DOCUMENTS

| | | | | |
|---|---|---|---|---|
| 6,418,433 | B1* | 7/2002 | Chakrabarti et al. | 707/5 |
| 6,594,694 | B1* | 7/2003 | Najork et al. | 709/219 |
| 6,636,848 | B1* | 10/2003 | Aridor et al. | 707/3 |
| 6,665,836 | B1* | 12/2003 | Wynblatt et al. | 715/205 |
| 6,785,671 | B1* | 8/2004 | Bailey et al. | 707/3 |
| 7,231,405 | B2* | 6/2007 | Xia | 707/104.1 |
| 7,260,573 | B1* | 8/2007 | Jeh et al. | 707/7 |
| 7,308,643 | B1* | 12/2007 | Zhu et al. | 715/206 |
| 7,346,604 | B1* | 3/2008 | Bharat et al. | 707/3 |
| 7,356,530 | B2* | 4/2008 | Kim et al. | 707/7 |
| 7,424,484 | B2* | 9/2008 | Ma et al. | 707/102 |
| 2002/0040326 | A1* | 4/2002 | Spratt | 705/26 |
| 2002/0194161 | A1* | 12/2002 | McNamee et al. | 707/2 |
| 2003/0046311 | A1* | 3/2003 | Baidya et al. | 707/200 |
| 2003/0149694 | A1 | 8/2003 | Ma et al. | |
| 2003/0208482 | A1* | 11/2003 | Kim et al. | 707/3 |
| 2004/0054654 | A1* | 3/2004 | Nomiyama et al. | 707/1 |
| 2004/0225644 | A1* | 11/2004 | Squillante et al. | 707/3 |
| 2005/0004943 | A1 | 1/2005 | Chang | |
| 2005/0192936 | A1* | 9/2005 | Meek et al. | 707/3 |
| 2005/0198268 | A1 | 9/2005 | Chandra | |
| 2005/0256887 | A1 | 11/2005 | Eiron et al. | |
| 2005/0262050 | A1 | 11/2005 | Fagin et al. | |
| 2005/0289140 | A1* | 12/2005 | Ford et al. | 707/5 |
| 2006/0064411 | A1 | 3/2006 | Gross et al. | |
| 2006/0074871 | A1 | 4/2006 | Meyerzon et al. | |
| 2006/0143197 | A1 | 6/2006 | Kaul et al. | |
| 2006/0224593 | A1* | 10/2006 | Benton et al. | 707/10 |
| 2006/0282336 | A1* | 12/2006 | Huang | 705/26 |
| 2006/0294098 | A1* | 12/2006 | Thomson et al. | 707/6 |
| 2007/0250486 | A1* | 10/2007 | Liao et al. | 707/3 |
| 2007/0255689 | A1* | 11/2007 | Sun et al. | 707/3 |

FOREIGN PATENT DOCUMENTS

| | | | |
|---|---|---|---|
| WO | WO 02/50703 | * | 6/2002 |
| WO | WO 2009/059480 | * | 5/2009 |

OTHER PUBLICATIONS

Nadav Eiron et al. "Analysis of Anchor Text for Web Search"SIGIR 2003 Toronto, Canada, 8 pages.*

Jasim Mohammed et al. "Anchor Text Analysis",Spring 2008 (May 16, 2008), 27 pages.*

Martin Ester et al. "Accurate and Efficient Crawling for Relevant Websites",Proceedings of the 30 VLDB Conference, 2004, pp. 396-407.*

Soumen Chakrabarti et al. "Focused crawling: a new approach to topic-specific Web resource discovery", Computer Networks 31 (1999) 1623-1640.*

Filippo Menczer et al. "Topical Web Crawlers: Evaluating Adaptive Algorithms", ACM Transactions on Internet Technology, vol. 4, No. 4, Nov. 2004, pp. 378-419.*

Craswell et al., "Relevance Weighting for Query Independent Evidence", Date: 2005, p. 416-423, http://delivery.acm.org/10.1145/1080000/1076106/p416-craswell.pdf?key1=1076106 &key2=2678416511&coll=GUIDE&dl=GUIDE&CFID=541089 &CFTOKEN=64465607.

Ganesh et al., "Ontology-based Web crawler", Date: 2004, vol. 2, p. 337-341, No. of pp. 1710, http://ieeexplore.ieee.org/ search/srchabstract.jsp?arnumber=1286658&isnumber=28683&pu number=9035&k2dockey=1286658@ieeecnfs&query=%28+ %28+url%3Cin%3Eab+%29+%3Cand%3E+%28+scor*+or+ rank*%3Cin%3Eab+%29+%29&pos=0.

Kang et al., "Query Type Classification for Web Document Retrieval", Date 2003, p. 64-71, http://delivery.acm.org/10.1145/870000/860449/p64-kang.pdf?key1=860449&key2=2892416511 &coll=GUIDE&dl=GUIDE&CFID=541089 &CFTOKEN=64465607.

Kraaij et al., "The Importance of Prior Probabilities for Entry Page Search", Date: 2002, p. 27-34, http://delivery.acm.org/10.1145/570000/564383/p27-kraaij.pdf?key1=564383.

* cited by examiner

CALCULATING A DOWNLOADING PRIORITY FOR THE UNIFORM RESOURCE LOCATOR IN RESPONSE TO THE DOMAIN DENSITY SCORE, THE ANCHOR TEXT SCORE, THE URL STRING SCORE, THE CATEGORY NEED SCORE, AND THE LINK PROXIMITY SCORE FOR TARGETED WEB CRAWLING

BACKGROUND

The Internet contains billions of documents (e.g., web pages) that are identified by respective uniform resource locators (URLs). Internet search engines index these documents, rank them, and perform queries against them. Web crawlers are applications that download web pages and index the downloaded web pages (and respective URLs) according to a particular categorization scheme. Web crawlers are often utilized to populate the document indices upon which search engines rely.

Web pages can be classified into different categories such as academic papers, commercial products, customer reviews, news, blogs, etc. Each of these categories only represents a portion of all documents available on the Internet. Consequently, using a general web crawl (e.g., one that employs a random or non-targeted approach) to find and index documents in a particular category becomes computationally expensive because of their relatively low frequency of occurrence among the billions of available Internet documents. For example, commercial product pages are estimated to constitute only 0.5 to 4.0 percent of all web pages on the Internet. Using a general web crawl to index these documents would therefore require 25 to 200 times the resources, hardware, and/or computer processing power compared to an indexing of general (e.g., uncategorized) web pages.

BRIEF SUMMARY

Techniques and technologies described herein are applicable for use in connection with a web crawler application. The web crawler application is controlled to download web pages in a targeted and prioritized manner that focuses on at least one designated category or type of web page. The web crawler application employs or is influenced by a suitably configured URL scoring module that makes crawling and indexing Internet documents more efficient, thus enabling such indexing to be performed with less computation and hardware. The URL scoring module achieves higher efficiency by predicting the location of target documents and directing the web crawler application towards these documents. The URL scoring module generates different scores (using different techniques or metrics) for URLs that identify web pages that have not yet been downloaded by the web crawler. An overall score or downloading priority is calculated for each URL using at least some of the individual scores for the respective URL. The web crawler application downloads URLs in an order that is influenced by the overall scores.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of an example embodiment may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments described herein or the application and uses of such embodiments.

Example embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that practical embodiments may be practiced in conjunction with any number of computing architectures and that the system described herein is merely one example embodiment.

For the sake of brevity, conventional techniques related to computer devices, web crawler applications, web page and URL indexing applications, data transmission, search engines, computer operating systems, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example embodiment.

Various embodiments may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 2:
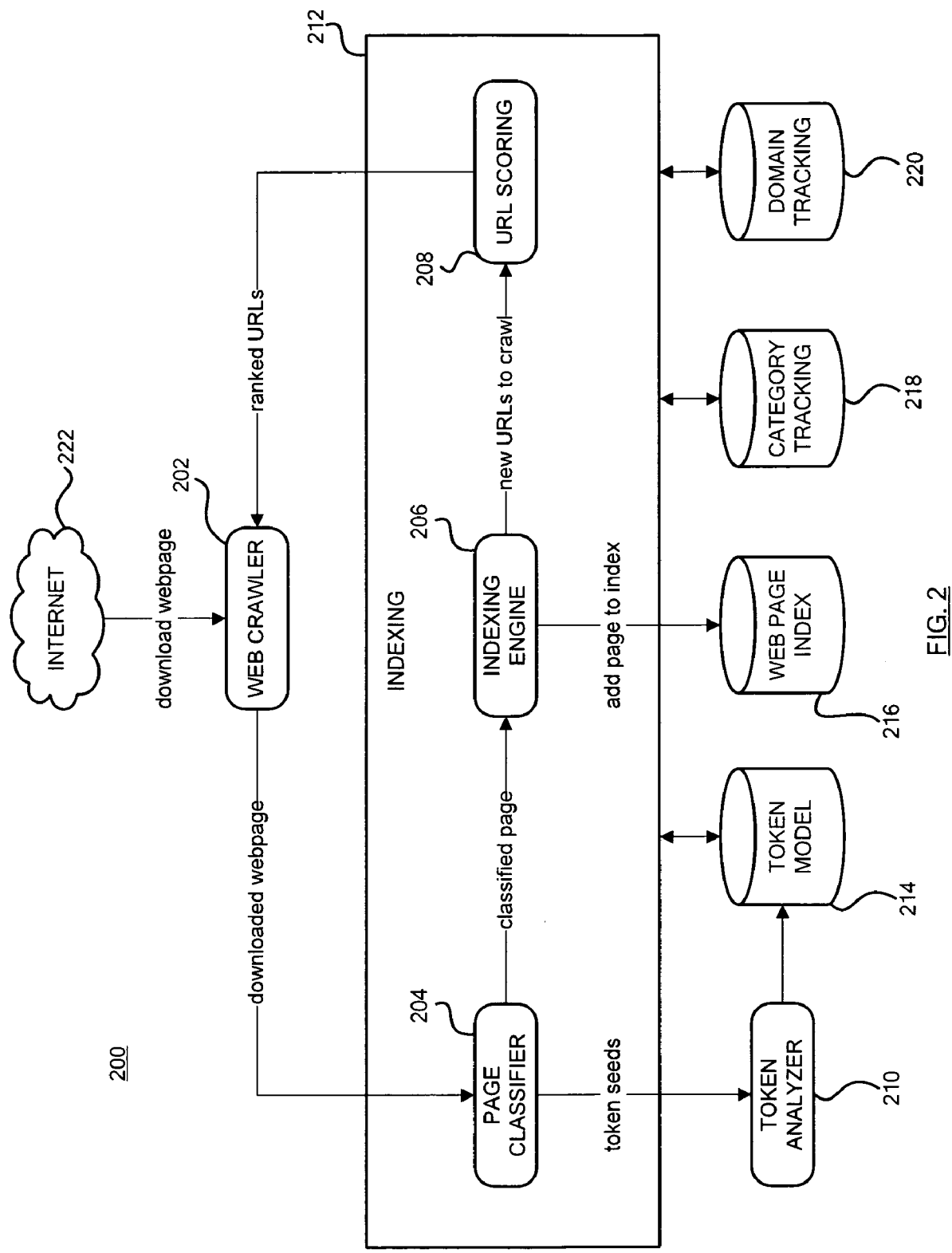
FIG. 2 is a schematic representation of a web crawler system that employs URL scoring for targeted crawling.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts one example arrangement of elements, additional intervening elements, devices, features, components, or modules may be present in an example embodiment.

Briefly, an example embodiment is directed to web crawling techniques and technologies that control a web crawler application to download web pages in a prioritized order. The downloading order is influenced by URL scoring that is performed for outlinks (and their corresponding URLs) contained in downloaded and analyzed web pages. The URL scoring makes crawling and indexing of web pages of a desired or specified type more efficient, thus enabling targeted web crawling to be performed with less computation and hardware.

A search index application based on commercial products is an example of a system that can use URL scoring techniques to build its index. For such an example, the web crawler application specifically targets web pages that represent items that consumers can purchase on the Internet. Typical web pages contain about 30 to 40 outgoing links. The sheer number of links results in an exponential growth in the number of URLs to process (for example, if we assume that each page has an average of 40 outgoing links, then the number of URLs to process grows at the rate of $40^n$, where n is the depth within a website). In this regard, if a website is visualized as a tree where the homepage is the root of the tree, then the depth within a website represents a measure of the growth or branching out of outgoing links. However, an analysis of typical pages in a commercial website shows that only a small portion of outgoing links actually lead to product detail pages. Commercial product pages are estimated to constitute only 0.5 to 4.0 percent of all pages on the Internet. By efficiently directing the web crawler towards product pages, a system as described herein is able to build an index of commercial products using minimal resources for web crawling.

Figure 1:
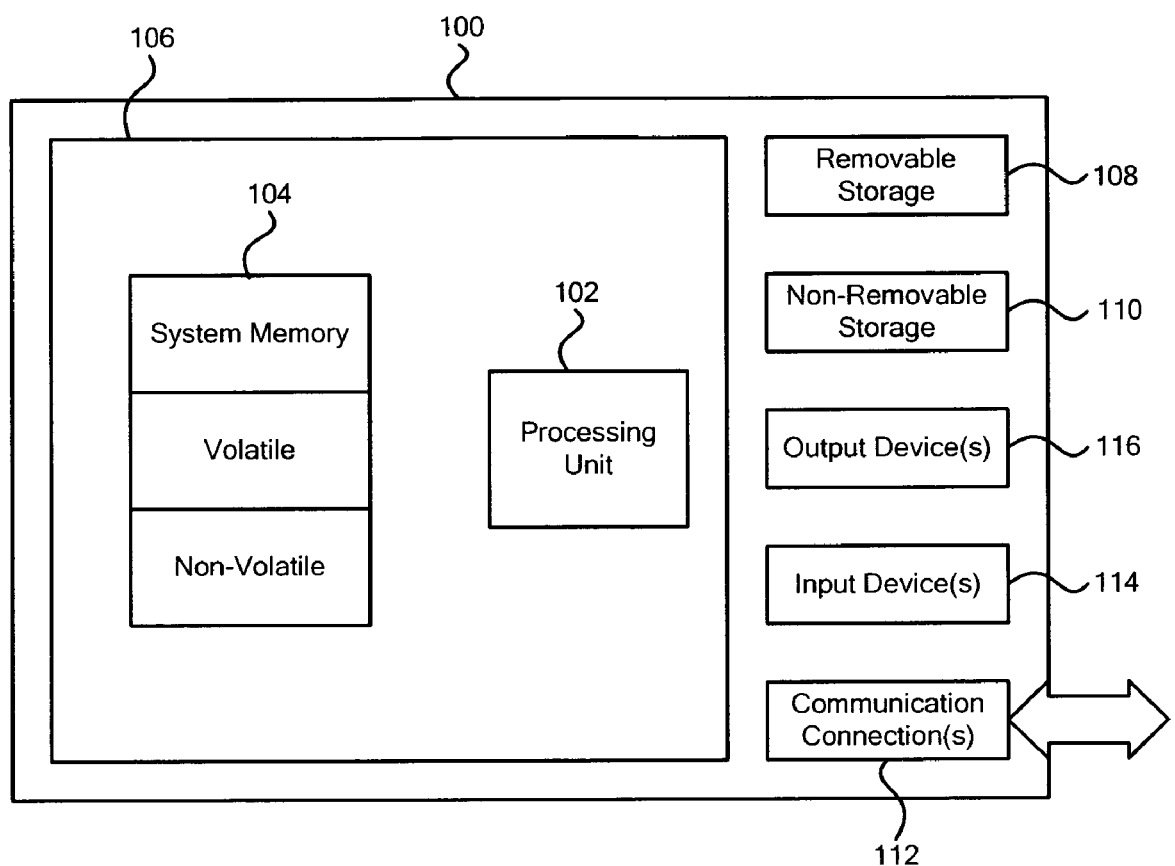
FIG. 1 is a simplified schematic representation of a computer system suitable for implementing an embodiment of a web crawler system.

FIG. 1 is a simplified schematic representation of an example computer system 100 for implementing an embodiment of a web crawler system. Computer system 100 is only one example of a suitable operating environment and is not intended to suggest any limitation as to the scope of use or functionality of any practical embodiment. Other well known computing systems, environments, and/or configurations that may be suitable for use include, but are not limited to, personal computers, server computers, hand-held or laptop devices, personal digital assistants, mobile telephones, multiprocessor systems, microprocessor-based systems, programmable consumer electronics, network PCs, minicomputers, mainframe computers, distributed computing environments that include any of the above systems or devices, and the like.

Computer system 100 and certain aspects of the example embodiments may be described in the general context of computer-executable instructions, such as program modules, application code, or software executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Computer system 100 typically includes at least some form of computer readable media. Computer readable media can be any available media that can be accessed by computer system 100 and/or by applications executed by computer system 100. By way of example, and not limitation, computer readable media may comprise computer storage media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer system 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Referring again to FIG. 1, in its most basic configuration, computer system 100 typically includes at least one processing unit 102 and a suitable amount of memory 104. Depending on the exact configuration and type of computing system 100, memory 104 may be volatile (such as RAM), non-volatile (such as ROM, flash memory, etc.) or some combination of the two. This most basic configuration is identified in FIG. 1 by reference number 106. Additionally, computer system 100 may also have additional features/functionality. For example, computer system 100 may also include additional storage (removable and/or non-removable) including, but not limited to, magnetic or optical disks or tape. Such additional storage is illustrated in FIG. 1 by removable storage 108 and non-removable storage 110. Memory 104, removable storage 108, and non-removable storage 110 are all examples of computer storage media as defined above.

Computer system 100 may also contain communications connection(s) 112 that allow the system to communicate with other devices. In embodiments described herein, communication connection(s) 112 may include, without limitation, suitably configured interfaces that allow computer system 100 to communicate with a network such as the Internet, external databases, external memory devices, and the like. Communications connection(s) 112 may be associated with the handling of communication media as defined above.

Computer system 100 may also include or communicate with input device(s) 114 such as a keyboard, mouse or other pointing device, pen, voice input device, touch input device, etc. Computer system 100 may also include or communicate with output device(s) 116 such as a display, speakers, printer, or the like. All of these devices are well know in the art and need not be discussed at length here.

FIG. 2 is a schematic representation of a web crawler system 200 that employs URL scoring for targeted crawling. Web crawler system 200 may utilize one or more computer systems as described above for computer system 100. Web crawler system 200 may include, for example: a web crawler core module 202; a web page classifier 204 coupled to web crawler core module 202; an indexing engine 206 coupled to the web page classifier 204; a URL scoring module 208 coupled to indexing engine 206; and a token analyzer 210 coupled to web page classifier 204. For this embodiment, web page classifier 204, indexing engine 206, and URL scoring module 208 represent (or are otherwise associated with) an indexing module 212 for web crawler system 200. As depicted in FIG. 2, indexing module 212 may include or communicate with a suitably configured token model database 214, a web page index 216, a category tracking database 218, and a domain tracking database 220. The various modules, elements, and components of an embodiment of web crawler system 200 may be coupled together or otherwise communicate with each other in the arrangement depicted in FIG. 2. Moreover, an embodiment of web crawler system 200 may include additional components, logic, or processing modules configured to support conventional web crawling, indexing, or web browsing functions that are not described herein.

Web crawler core module 202 is configured to download web pages for analysis and indexing by web crawler system 200. Generally, web crawler system 200 analyzes downloaded web pages, ranks/scores the outgoing links (which correspond to outgoing URLs that point to different web pages) contained in the downloaded web pages using URL scoring module 208, and uses the URL scores to influence the order in which web crawler core module 202 downloads web pages corresponding to the outgoing links.

In one embodiment of web crawler system 200, web crawler core module 202 downloads web pages from the Internet 222 in accordance with a specific downloading priority scheme. For example, the downloading priority scheme may focus web crawler system 200 on web pages of a designated type, a desired category, a certain genre, or on web pages that otherwise share certain characteristics. The following description uses commercial web pages as one non-limiting example, where a commercial web page contains commercial data or information such as: a product review; product literature or instructions; products for purchase; or the like. Embodiments of web crawler system 200 may be suitably configured to target other types of web pages, such as, without limitation: personal blogs; political pages; news pages; sports pages; educational or reference pages; etc.

Web crawler core module 202 is suitably configured to download web pages from the Internet 222 using well known protocols such as HTML, IP, and other applicable technologies. In this regard, web crawler core module 202 may include or cooperate with an appropriate web crawler application. For this example, web crawler core module 202 provides downloaded web pages (and possibly descriptive data, characterization data, or metadata related to the downloaded web pages) to web page classifier 204 for analysis. In this regard, web page classifier 204 may be configured to analyze the web pages downloaded by web crawler core module 202 in an appropriate manner to obtain relevant information about the downloaded web pages. For example, web page classifier 204 may analyze and process: content included in a web page, the URL of the web page; anchor text (i.e., the visible text associated with a hyperlink on the web page) of outgoing links on the web page; the URLs of outgoing links on the web page; and the like. Web page classifier 204 sends classified web pages (and possibly descriptive data, characterization data, or metadata related to the classified web pages) to indexing engine 206 for further processing.

For this example of web crawler system 200, token analyzer 210 is suitably configured to discover, extract, or generate tokens corresponding to downloaded web pages. As used here, a token is a digital representation of a word, a number, a character string, etc. In practical embodiments, each token processed by web crawler system 200 has the same bit length. In particular, token analyzer 210 derives tokens from token seeds extracted from the anchor text of outlinked web pages referenced by downloaded web pages and/or from the token seeds extracted from the URL strings of outlinked web pages referenced by downloaded web pages, where a "token seed" represents data that is utilized to generate a respective token for web crawler system 200. As depicted in FIG. 2, web page classifier 204 discovers, extracts, or generates token seeds, and sends the token seeds to token analyzer 210 for further processing. Tokens, the manner in which they are generated, and the manner in which they are processed are described in more detail below.

Indexing engine 206 is suitably configured to process and index the classified web pages in any designated manner. In a practical deployment, indexing engine 206 is compatible with one or more Internet search engines that rely on the indexing output of indexing engine 206. Indexing engine 206 is generally configured to index and categorize the downloaded web pages (and URLs) according to the desired criteria to facilitate searching and retrieval of the indexed web pages. In this regard, indexing engine 206 may add indexed web pages to web page index 216 as needed. Of course, indexing engine 206 may also be configured to update web page index 216 as needed, and indexing engine 206 may also perform a number of operations that are unrelated to the URL scoring techniques and technologies described herein.

Indexing engine 206 may pass one or more new URLs to URL scoring module 208. These new URLs represent URLs that have not yet been downloaded by web crawler core module 202. In this embodiment, these new URLs are associated with outgoing web page links (outlinks) contained in previously downloaded web pages. For example, a downloaded web page corresponding to $URL_1$ may include outgoing links to any number of outlinked web pages, including a first outlinked web page corresponding to $URL_2$ and a second outlinked web page corresponding to $URL_3$. $URL_2$ and $URL_3$ are considered "new" URLs and indexing engine 206 would forward $URL_2$ and $URL_3$ (and possibly descriptive data, characterization data, or metadata related to $URL_2$ and $URL_3$) to URL scoring module 208 for further processing.

URL scoring module 208 is suitably configured to assign a respective downloading priority to each new URL, where the downloading priority is based upon a plurality of metrics. Each of these metrics, which are described in more detail below, indicates a different measure of probability that an outlinked web page is of a desired or designated type. For this example, each of these metrics indicate a different measure of the likelihood that an outlinked web page is a commercial product page that allows a user to purchase at least one product. An embodiment of URL scoring module 208 may also be configured to assign downloading priorities to new URLs based upon one or more metrics that otherwise influence the order in which web crawler core module 202 downloads new web pages.

For this example, URL scoring module 208 is suitably configured to generate a plurality of scores for a new URL, where each individual score is related to a different scoring or ranking metric. These metrics include, without limitation: a domain density metric that results in a domain density score for the URL; an anchor text metric that results in an anchor text score for the URL; a URL string score metric that results in a URL string score for the URL; a link proximity metric that results in a link proximity score for the URL; and a category need metric that results in a category need score for the URL—the category need metric may indicate a predicted category for the web page corresponding to the URL. URL scoring module 208 calculates a downloading priority (an overall score for the URL) from at least some of the individual scores. The downloading priority may, for example, be a simple numerical score. In one embodiment, URL scoring module 208 calculates the downloading priority in response to all of the individual scores by processing the individual scores with a suitable algorithm or function. Thereafter, URL scoring module 208 provides the new URLs, along with their respective downloading priorities, to web crawler core module 202, which then downloads the web pages corresponding to the new URLs in an order that is determined by the downloading priorities. This prioritization forces web crawler system 200 to concentrate on web pages of the desired type, category, subcategory, genre, or the like.

Domain Density Metric

The domain density score is used to predict the density of desired web page types within a particular set of web pages. Different grouping can be achieved by using different commonality metrics. One such grouping could use the domain name of a web page. For example, the URL <www.xyz.com/a/b/c> consists of the domain name, "xyz.com" and has the host name "www". One could choose to group web pages by the domain name and so one such group would contain all web pages with a URL containing the domain name "xyz.com". Various other grouping techniques could be used as well.

Referring to FIG. 2, the indexing rate for each domain is maintained in domain tracking database 220. Generally, the domain density score resulting from the domain density metric indicates relevance of a URL to a desired web page type. In the example where commercial product web pages are of interest, for each domain, the domain density metric maintains a count of the total product pages indexed and the total pages processed.

The domain density is the ratio: I/P, where I represents the total product pages indexed for the given domain and P is the total pages processed for the given domain. This domain density ratio is a measure that describes the overall yield of a particular domain. In order to maximize the yield of web crawler system 200, URLs from relatively high yield domains are promoted above URLs from relatively low yield domains.

In practice, the domain density ratio will be a number between zero and one. In certain embodiments of web crawler system 200, the raw domain density ratio is normalized for ease of processing with scores generated by the other metrics. In this regard, the resulting domain density score may be generated as any suitable function of the domain density ratio:

$$\text{Domain Density Score} = F\left(\frac{I}{P}\right),$$

where F(x) is a mapping function that generates a result between a minimum value and a maximum value. These minimum and maximum values may be selected to suit the needs of the particular deployment. As one non-limiting example, the mapped range may be zero to 100.

Anchor Text Metric

The anchor text metric is used to predict the likelihood that the anchor text of a URL will lead to a web page of the desired type/category. Anchor text represents the visible hyperlink text as rendered in connection with a linked web page. Anchor text is usually (but need not always be) different than the underlying URL character string. For example, the URL <www.acme123.com> may be accessed using a hyperlink with the anchor text ACME COMPUTER SALES.

Analysis of the anchor text of a link is another metric used to score a URL. In the example where commercial product web pages are of interest, the anchor text metric results in an anchor text score that indicates probability that the outlinked web page is a product page. Common terms that appear in the anchor text yield a statistical trend that can help to predict where a link is leading. By matching the anchor terms associated with a link to tracked terms, one can determine the statistical probability that the link will lead to a product detail page.

One exemplary anchor text metric suitable for use with web crawler system 200 is described below in the context of the following definitions:

C=event that a URL leads to a product page;
$T_n$=event that token $T_n$ appears in the anchor text for a URL;
P(C)=probability that a URL leads to a product page;
$P(C|T_n)$=probability that a URL leads to a product page given that $T_n$ appears in the anchor text; and
$P(C|T_1, T_2)$=probability that a URL leads to a product page given that $T_1$ and $T_2$ appear in the anchor text.

Ultimately, the goal is to identify URLs where P(C) is relatively high. It is known from empirical analysis that P(C) for any random URL will usually be between 0.005 and 0.04 given that the frequency of product pages is between 0.5 to 4.0 percent of all web pages. In order to choose URLs having higher values of P(C), the event C is correlated with the occurrence of different anchor text tokens represented by $T_n$. The following procedure is used to develop a model of anchor text tokens. Referring to FIG. 2, token analyzer 210 is configured to generate the token models for the various URLs, and the token models are maintained in token model database 214.

Single Term Correlation Training Procedure

Training may be utilized to generate models utilized by the system. In this regard, a training set is a set of example web pages used for generating the model. The training set contains web pages that have been classified over the desired page type such that the set contains both examples of desired pages and examples of non-desired pages. In connection with one training procedure, for each web page in the training set: (a) tokenize terms in the anchor text by separating the anchor text into words by using any suitable word separation scheme, e.g., use spaces and non-alphanumeric characters as word separators; and (b) generate a token for each word, e.g., compute a hash value over the word string, after which the token can be referenced purely by its has value.

For each term, compute:

$$P(C|T_n) = \frac{\text{Product Count for } T_n}{\text{Total Count for } T_n}.$$

In addition, more specific probabilities can be obtained by calculating multiple term probabilities. In this regard, the data is processed to additionally calculate the probabilities for $P(C|T_{n1}, T_{n2}, \ldots, T_{nx})$, where x is the desired number of terms to correlate with event C. To compute multiple term correlations for any x greater than or equal to two can become computationally expensive. One procedure to reduce the set of probabilities to calculate is the following.

Multiple Term Correlation Training Procedure

For each page in the training set: (a) tokenize terms in the anchor text using a suitable word separation scheme; (b) compute a hash value for each term; (c) look up each term by hash code in the computed table containing $P(C|T_n)$; (d) from the list of all matched terms where $P(C|T_n)$ > Threshold, compute all possible multi term hashes $(T_{n1}+T_{n2}+\ldots+T_{nx})$, i.e., for list of terms $T_1$ to $T_n$, compute all term combinations represented in combinatorics as C(n,x) for x=2 to any desired level of multi-term correlation; (e) for each matched multiple term hash, increment the product page count and the total count if the current page is a product page, otherwise only increment the total page count.

After performing the single and multiple term training procedures on the training set, the resulting set of $P(C|T_n)$ and $P(C|T_{n1}, T_{n2}, \ldots, T_{nx})$ is the anchor text model file. The score of an outgoing URL is based on the value of the probability. URLs with no matched anchor text have unknown probability of leading to a product page.

Scoring Procedure for each URL Processed

1. Compute the hash for all anchor text terms.
2. Look up each term by hash in the model file to find $P(C|T_n)$.
3. From the list of all terms where $P(C|T_n)$>High Threshold, compute all possible multiple-term hashes ($T_{n1}+T_{n2}+\ldots+T_{nx}$) where x is equal to the multiple-term level used within the model file.
4. Look up each computed multiple-term hash in the model file.
5. PScore=Max($P(C|T_{n1}, T_{n2}, \ldots, T_{nx})$), i.e., out of all matched terms, take the maximum probability to represent the probability of the link leading to event C.

In addition, the negative correlation for event C can also be calculated using the following procedure:

6. From the list of all terms where $P(C|T_n)$<Low Threshold, compute all possible multiple-term hashes ($T_{n1}+T_{n2}+\ldots+T_{nx}$) where x is equal to the multiple-term level used within the model file.
7. Look up each computed multiple-term hash in the model file.
8. NScore=Min($P(C|T_{n1}, T_{n2}, \ldots, T_{nx})$), i.e., out of all matched terms, take the lowest probability to represent the probability of the link not leading to event C.

For this example embodiment, assigning the final probability can use any function that uses both PScore and NScore as inputs. One such function is described below, where the final score is selected using the following procedure:

If (NScore<Threshold1), then FinalScore=NScore.
If (NScore>Threshold1) and if (PScore>(1−NScore)), then FinalScore=PScore.
If (NScore>Threshold1) and if (PScore<(1−NScore)), then FinalScore=NScore.

In practice, the anchor text score will be a probability, i.e., a number between zero and one. In certain embodiments of web crawler system 200, the raw anchor text score is normalized for ease of processing with scores generated by the other metrics. For example, the raw anchor text score can be normalized in a manner similar to that described above for the domain density score.

URL String Score Metric

The URL string score metric is used to predict the likelihood that a URL string will lead to a web page of the desired type/category. The URL string represents the actual character string that defines the URL (in contrast to the anchor text, which is the visible rendered link that corresponds to the underlying URL string). In the example where commercial product web pages are of interest, the URL string score metric results in a URL string score that indicates probability that the outlinked web page is a product page.

URL string scoring is similar to anchor text scoring except that the tokens are derived from the actual URL string rather than the URL anchor text. Thus, the URL string score is generated in response to alphanumeric characters contained in the URL itself. Tokenization is performed by using any suitable word separation scheme for URLs. One such scheme is to separate words using any non-alphanumeric character. Referring to FIG. 2, token analyzer 210 is configured to generate the token models for the various URL strings, and the token models are maintained in token model database 214. In addition, since URL string tokens tend to be very domain specific, the token tables may be segmented by URL domains. In addition, a general token table is also maintained that is used for any domain where there does not exist a token table. The general token table contains tokens that appear in more than one domain. The top X tokens are chosen for this set and are sorted based on the number of domains in which they appear.

Scoring Procedure

1. Compute the hash value for the URL domain.
2. Look up token table based on URL hash. If no table is found, use the general token table.
3. Score in the manner described above for the anchor text metric, except use URL string tokens and not anchor text tokens.

In practice, the URL string score will be a probability, i.e., a number between zero and one. In certain embodiments of web crawler system 200, the raw URL string score is normalized for ease of processing with scores generated by the other metrics. For example, the raw URL string score can be normalized in a manner similar to that described above for the domain density score.

Link Proximity Metric

For this example, the link proximity metric employs local graph analysis to predict the density of product pages within a graph that represents linking relationships between URLs. In this example, a set of web pages is represented as a graph where each page is a node on the graph and a link is an edge on the graph connecting two nodes. In the example where commercial product web pages are of interest, the link proximity metric results in a score that indicates likelihood that a link is leading to a region of the graph where the node density of product web pages is high.

The link proximity metric analyzes the linking structure of a set of web pages. It has been observed that pages of similar types tend to occur in close proximity to each other where distance is measured by the number of links between two pages. From this observation, traversal paths that exhibit high occurrences of product pages will tend to yield more product pages because there are other product pages in close proximity. The link proximity metric influences growth and decay of URL scores to estimate the relative density of product pages in a graph without tracking paths explicitly.

Table 1 shows how a URL score is modulated based on the current page classification and the outgoing link classification. The following terms are utilized in Table 1:

TABLE 1

| CURRENT PAGE | PREDICTED OUTGOING LINK TYPE | INPUT SCORE | OUTPUT SCORE |
|---|---|---|---|
| Product | Product | m | $m[1 + \alpha]$ |
| Product | Non-Product | m | $m[1 + \alpha * 0.5]$ |
| Non-Product | Non-Product | m | $(m)(\beta)$ |

$\alpha$ - Alpha is the growth factor in the open range $[0, \infty]$; and
$\beta$ - Beta is the decay factor in the range of $[0, 1]$.

In layman's terms, an outgoing URL will have a higher link proximity score and, therefore, a higher overall score if the directly linking URL is associated with a product web page. Conversely, an outgoing URL will have a lower link proximity score and, therefore, a lower overall score if the directly linking URL is associated with a non-product web page. Moreover, the link proximity score will be relatively high if there are no intervening non-product web pages linked between an indirectly linking URL and the URL being analyzed (and relatively low if there are one or more intervening non-product web pages).

Category Need Metric

The category need metric may be utilized to promote even distribution of product taxonomies within the index. In the example where commercial product web pages are of interest, the category need metric results in a category need score that is influenced by a current distribution of categories (or subcategories) associated with commercial product pages. The category need score may indicate a predicted category for the outgoing URL such that the web crawler system favors (or disfavors) the outgoing URL in accordance with its predicted category. Thus, in addition to improving the efficiency of the web crawl, a conscious effort is implemented to ensure that the right types of documents are indexed. With respect to commercial products, it may be desirable to have representation of products from a range of product taxonomies such as electronics, home and garden, cosmetics, furniture, etc. The category need metric may be influenced by any desired distribution or weighting scheme.

With respect to commercial product searching, the taxonomy classification of a product page occurs within page classifier 204 shown in FIG. 2. In this embodiment, all products map to a finite number of taxonomy categories and a count of indexed web pages is maintained for each category using category tracking database 218. The list of categories are sorted and ranked in descending order based on their counts. The lower the count, the higher the rank. This ensures that underrepresented categories are crawled with a higher priority. The overall effect is a more even distribution of products across all categories.

The category need metric may be configured to generate the category need score in the following manner. For each outgoing URL to be scored, determine the respective category rank based on the following cases contained in Table 2.

TABLE 2

| Current Page Type | Category |
| --- | --- |
| product page, and link is a list record | categorize the list record to approximate the category to which the list record points; use this category for scoring |
| product page, and link is not a list record | use the category of the current product page for scoring; the basic assumption is that a product of a particular category will most likely point to other products or accessories from the same category |
| non-product page | choose the category with the lowest rank |

Once the category has been determined, the score is calculated by mapping it linearly across the score range. The category need score may be computed in the following manner.

Category_Confidence=value in the range [0, 1] that represents the confidence of the category classification;

Slope=(Score$_{min}$−Score$_{max}$)/Total_Categories;

Category_Rank=whole number value in the range of [0, Total_Categories−1]; and

Score=Slope(Category_Rank+Category_Confidence)+Score$_{max}$.

In practice, the category need score will translate into a number. In certain embodiments of web crawler system 200, the raw category need score is normalized for ease of processing with scores generated by the other metrics. For example, the raw category need score can be normalized in a manner similar to that described above for the domain density score to obtain a number within a specific range.

Overall Score (Downloading Priority)

The overall score or downloading priority for an outlinked URL is calculated in response to at least some of the individual metric scores described above. In practice, an overall score can be generated using any combination of the metrics described above (and, in some embodiments, in addition to other suitable metrics). For this example, the overall score is calculated in response to the domain density score, the anchor text score, the URL string score, and the category need score, and the overall score is also influenced by the link proximity score. In one embodiment, a "combined" score is generated from the domain density, anchor text, URL string, and category need scores, and that combined score is adjusted using the link proximity score to obtain the downloading priority.

In one embodiment, the overall score may be computed by applying all the metrics mentioned above into a suitable multi-input function, where:

$f(x)$=a non-linear mapping function that results in a value in the range [min, max];

$S_1$=link proximity score;

$S_2$=domain density score;

$S_3$=anchor text score;

$S_4$=URL string score;

$S_5$=category need score;

$G(S_1, S_2, S_3, S_4, S_5)$=multi-input function that results in a value in the range [min, max]; and Overall Score=$G(S_1, S_2, S_3, S_4, S_5)$.

One suitable $G(\ldots)$ function is a weighted sum function where:

Overall Score=$G(S_1, S_2, S_3, S_4, S_5)$=
$w_1 \times f(S_1) + w_2 \times f(S_2) + w_3 \times f(S_3) + w_4 \times f(S_4) + w_5 \times f(S_5)$;

where $w_1 + w_2 + w_3 + w_4 + w_5 = 1$; and $w_1, w_2, w_3, w_4, w_5 > 0$.

Depending upon the implementation of web crawler system 200, the $G(\ldots)$ function may leverage a neural net, a support vector machine (SVM), or the like.

Figure 3:
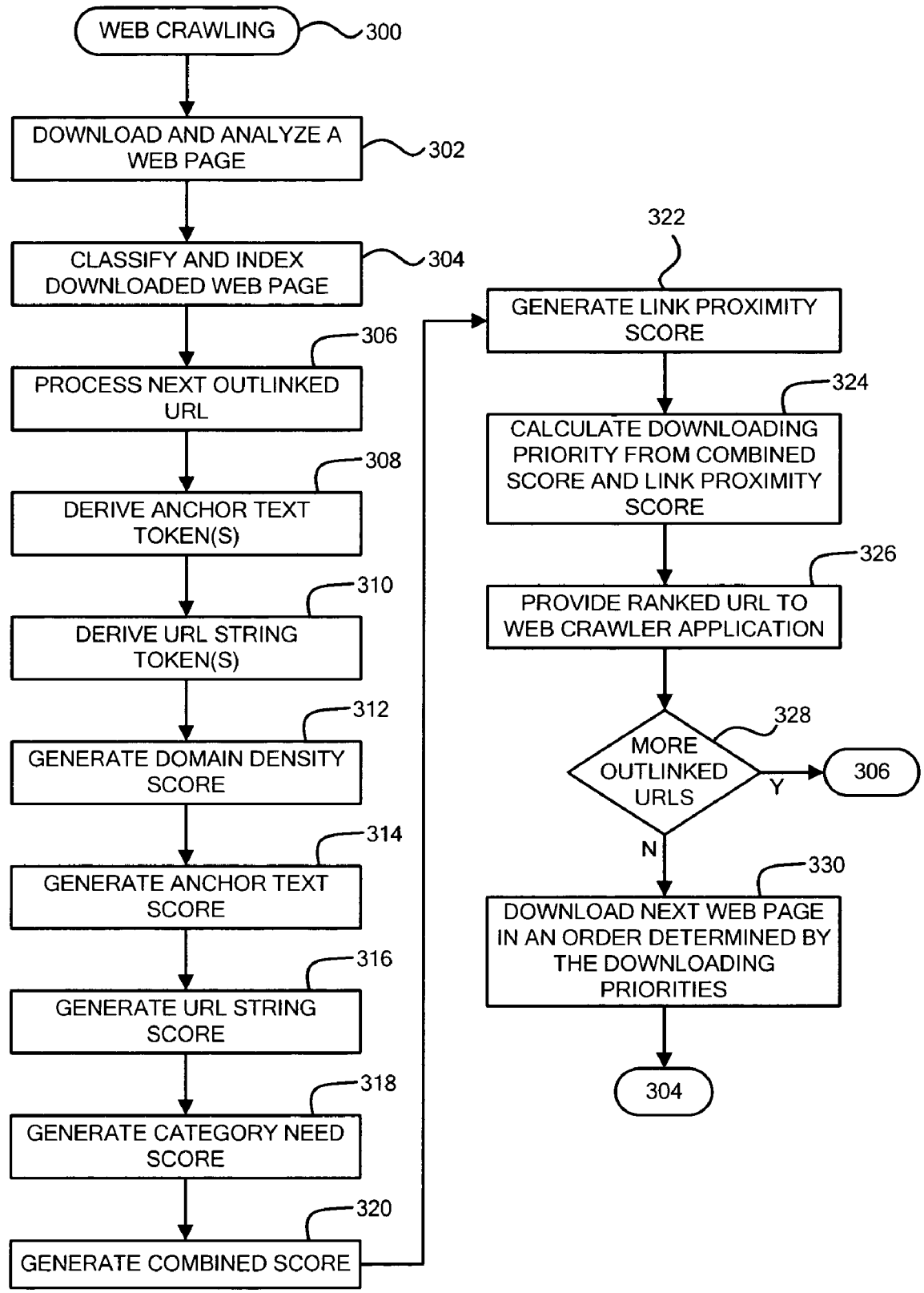
FIG. 3 is a flow chart that illustrates a targeted web crawling process that can be performed by an embodiment of a web crawler system.

FIG. 3 is a flow chart that illustrates a targeted web crawling process 300 that can be performed by an embodiment of a web crawler system, such as web crawler system 200. The various tasks performed in connection with process 300 may be performed by software, hardware, firmware, or any combination thereof. For illustrative purposes, the following description of process 300 may refer to elements mentioned above in connection with FIGS. 1-2. In practical embodiments, portions of process 300 may be performed by different elements of the described system, e.g., a web crawler core module, a page classifier, a token analyzer, or a URL scoring module. It should be appreciated that process 300 may include any number of additional or alternative tasks, the tasks shown in FIG. 3 need not be performed in the illustrated order, and process 300 may be corporated into a more comprehensive procedure or process having additional functionality not described in detail herein.

Web crawling process 300 may begin by downloading and analyzing a web page 302) that links to one or more outlinked web pages having corresponding URLs and domains. In one embodiment, process 300 may be initiated with any number of "weed" web pages that are of a desired type or category. For example, process 300 may initially download one or more web pages that have already been determined to be commercial product web pages. Once process 300 begins, it can spider out in a self-propagating manner. As described later, task 302 may download web pages in accordance with downloading priorities attached to URLs in a downloading queue.

For ease of description, web crawling process 300 is described in the context of processing one web page at a time. An embodiment of a web crawler system, however, may process any number of web pages and any number of URLs in a concurrent or parallel manner using equivalent techniques. After downloading, process 300 classifies the downloaded web page to obtain information about the web page, and indexes the downloaded web page in an appropriate manner (task 304). Task 304 may analyze the content of the downloaded web page to determine whether the downloaded web page is of a desired type, to identify outlinks contained in the downloaded web page, to categorize the downloaded web page, etc. Assuming that the downloaded web page includes at least one outlink, process 300 will process the next outlinked URL (task 306) in the manner described below.

In this embodiment, web crawling process 300 assumes that the outlinked URLs have not been downloaded by the web crawler application and, therefore, are "new" URLs. Each new URL is analyzed and processed to obtain a downloading priority score for that URL. In this embodiment, process 300 derives one or more anchor text tokens from the URL (task 308). As mentioned above in connection with the anchor text metric, task 308 may be performed to extract words from the anchor text of the URL and, for each extracted word, calculate a respective hash value that serves as an anchor text token. Moreover, task 308 may be performed to extract words from the anchor text, identify at least one combination of extracted words, and, for each combination of words, calculate a respective hash value that serves as an anchor text token. Likewise, process 300 may derive one or more URL string tokens from the character string of the URL (task 310). As mentioned above in connection with the URL string metric, task 310 may be performed to extract strings from the URL and, for each extracted string, calculate a respective hash value that serves as a URL string token. Moreover, task 310 may be performed to extract strings from the URL, identify at least one combination of extracted strings, and, for each combination of strings, calculate a respective hash value that serves as a URL string token.

As described previously, web crawling process 300 may be suitably formatted to generate a plurality of scores for the URL, where each of the scores indicates a different measure related to whether the URL corresponds to a desired web page type, such as a commercial product or a subcategory of commercial products. Again, any number of scoring metrics may be employed by an embodiment of a web crawler system. In this example, process 300 generates a domain density score (task 312) in response to the domain of the URL being analyzed. As explained above in connection with the domain density metric, task 312 may be performed to obtain a ratio of a number of indexed pages to a number of processed pages (where the number of indexed pages represents a number of web pages from the domain having the desired web page type, and where the number of processed pages represents a total number of web pages from the domain processed by the web crawling system). In addition, task 312 may be performed to calculate the domain density score from the ratio using an appropriate algorithm or formula.

In this example, web crawling process 300 also generates an anchor text score (task 314) in response to the anchor text of the URL being analyzed. Notably, task 314 may utilize the anchor text token(s) derived by task 308. As mentioned above in connection with the anchor text metric, for each extracted word, task 314 calculates a word score that indicates the probability of relevance to the desired web page type (e.g., commercial product web pages). Moreover, task 314 calculates a combined word score that indicates the probability of relevance to the desired web page type. In this example, one of the individual scores (word score or combined word score) is selected as the anchor text score utilized by process 300.

In this example, web crawling process 300 also generates a URL string score (task 316) in response to alphanumeric characters of the URL being analyzed. Notably, task 316 may utilize the URL string token(s) derived by task 310. As mentioned above in connection with the URL string metric, for each extracted string, task 316 calculates a string score that indicates the probability of relevance to the desired web page type. Moreover, task 316 calculates a combined string score that indicates the probability of relevance to the desired web page type. In this example, one of the individual scores (string score or combined string score) is selected as the URL string score utilized by process 300.

In this example, web crawling process 300 also generates a category need score (task 318) in response to characteristics of the downloaded web page (and/or in response to characteristics of the anchor text or URL string of the URL being analyzed). Notably, task 318 may leverage some of the results of task 304. For this embodiment, task 318 may be performed to identify a category for the downloaded web page, where the identified category is one of a predetermined plurality of categories. If representation of the identified category in the current distribution of the categories is relatively high, then process 300 generates a relatively low category need score. On the other hand, if representation of the identified category in the current distribution is relatively low, then process 300 generates a relatively high category need score. Moreover, the category tracking database may be updated as needed in response to the analysis of new URLs.

For this embodiment, web crawling process 300 generates/calculates a combined score (task 320) for the URL in response to the domain density, anchor text, URL string, and category need scores. This combined score may be derived using any suitable formula, algorithm, or relationship. In addition, process 300 may generate a link proximity score for the URL (task 322) and calculate a downloading priority for the URL from the combined score and the link proximity score (task 324). In this regard, the downloading priority is also influenced by the link proximity score. In one embodiment, the link proximity score is based upon historical data relating to previously downloaded web pages. For example, if the web page downloaded in task 302 (e.g., $URL_1$) was previously analyzed and ranked by process 300, then the web crawling system can retain the downloading priority score and/or the combined score for $URL_1$. If task 322 is processing $URL_2$ (which is outlinked from $URL_1$), then the downloading priority score and/or the combined score for $URL_1$ can be processed to generate the link proximity score for $URL_2$ or to otherwise influence the combined score for $URL_2$. In other words, a "past" downloading priority for a linking web page may be processed when generating the link proximity score for a related linked web page.

Eventually, web crawling process 300 assigns the downloading priority to the URL and provides the ranked URL, along with its downloading priority, to the web crawler application (task 326). The web crawler application may be included in, or executed by, the web crawler core module 202 in FIG. 2). If process 300 determines that the downloaded web page (from task 302) contains more outlinked URLs that need to be analyzed (query task 328), then process 300 may be re-entered at task 306 to perform a similar procedure on the next outlinked URL. Otherwise, process 300 may proceed to download the next web page in an order that is determined by its downloading priority (task 330). In practice, the downloading order may be influenced by the different downloading priorities of any number of new URLs that are in a queue waiting to be downloaded by the web crawler application. After the next web page has been downloaded, process 300 can be re-entered at task 304 such that the next web page can be analyzed and processed in a like manner.

Web crawling process 300 and the techniques and technologies described herein can be employed in a self-propagating manner such that the web crawler application is directed in a focused, efficient, and targeted manner to download web pages of interest. These techniques and technologies can be leveraged in a practical embodiment that conserves computing resources.

While at least one example embodiment has been presented in the foregoing detailed description, it should be appreciated that a vast number of variations exist. It should also be appreciated that the example embodiment or embodiments described herein are not intended to limit the scope, applicability, or configuration of the systems, methods, or devices in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented targeted web crawling method comprising:
   analyzing a downloaded web page that links to an outlinked web page having a URL and belonging to a sub-group of web pages;
   generating a domain density score in response to the sub-group, where the domain density score indicates relevance of the URL to a desired content-based web page type;
   deriving one or more anchor text tokens from the URL;
   generating an anchor text score based on the derived one or more anchor text tokens and information stored in a token model database, where the anchor text score indicates probability that a content of the outlinked web page is of the desired content-based web page type;
   deriving one or more URL string tokens from the URL;
   generating a URL string score based on the derived one or more URL string tokens and information stored in the token model database, where the URL string score indicates probability that the content of the outlinked web page is of the desired web page type;
   generating a category need score in response to characteristics of the downloaded web page, where the category need score is influenced by a current distribution of a plurality of categories associated with the desired content-based web page type, wherein generating the category need score comprises:
      identifying a category for the downloaded web page in response to the analyzing step, wherein the category is one of the plurality of categories;
      if representation of the category in the current distribution is relatively high, generating a relatively low category need score; and
      if representation of the category in the current distribution is relatively low, generating a relatively high category need score;
   generating a link proximity score for the URL, where the link proximity score indicates linking distance from the URL to a linking URL that corresponds to the desired content-based web page type, the linking distance is measured by a number of links between the URL to the linking URL in a linking structure;
   calculating a downloading priority for the URL in response to the domain density score, the anchor text score, the URL string score, the category need score, and the link proximity score; and
   downloading, in an order determined by the downloading priority, a second web page that corresponds to the URL.

2. A method according to claim 1, further comprising:
   downloading, in an order determined by the downloading priority, a second web page that corresponds to the URL, the second web page containing a second outlinked web page having a second URL; and
   processing the downloading priority when generating a second link proximity score for the second URL.

3. A method according to claim 1, wherein generating the domain density score comprises:
   obtaining a ratio of a number of indexed pages to a number of processed pages, where the number of indexed pages represents a number of web pages from the sub-group having the desired content-based web page type, and where the number of processed pages represents a total number of web pages from the sub-group processed by the web crawling method; and
   calculating the domain density score from the ratio.

4. A method according to claim 1, wherein generating the anchor text score comprises:
   extracting words from the anchor text of the URL; and
   for each word extracted from the anchor text of the URL, calculating a word score that indicates probability of relevance to the desired content-based web page type.

5. A method according to claim 1, wherein generating the anchor text score comprises:
   extracting words from the anchor text of the URL;
   identifying at least one combination of words extracted from the anchor text of the URL; and
   for each combination of words, calculating a combined word score that indicates probability of relevance to the desired content-based web page type.

6. A method according to claim 1, wherein generating the URL string score comprises:
   extracting strings from the URL; and
   for each string extracted from the URL, calculating a string score that indicates probability of relevance to the desired content-based web page type.

7. A method according to claim 1, wherein generating the URL string score comprises:
   extracting strings from the URL;
   identifying at least one combination of strings extracted from the URL; and
   for each combination of strings, calculating a combined string score that indicates probability of relevance to the desired content-based web page type.

8. A computer-readable medium having computer-executable instructions for performing steps comprising:
   analyzing a downloaded web page that links to an outlinked web page having a URL and belonging to a sub-group of web pages;
   generating a domain density score in response to the sub-group, where the domain density score indicates relevance of the URL to a desired content-based web page type;
   deriving one or more anchor text tokens from the URL;
   generating an anchor text score based on the derived one or more anchor text tokens and information stored in a token model database, where the anchor text score indicates probability that a content of the outlinked web page is of the desired content-based web page type;
   deriving one or more URL string tokens from the URL;
   generating a URL string score based on the derived one or more URL string tokens and information stored in the token model database, where the URL string score indicates probability that the content of the outlinked web page is of the desired web page type;

generating a category need score in response to characteristics of the downloaded web page, where the category need score is influenced by a current distribution of a plurality of categories associated with the desired content-based web page type, wherein generating the category need score comprises:
  identifying a category for the downloaded web page in response to the analyzing step, wherein the category is one of the plurality of categories;
  if representation of the category in the current distribution is relatively high, generating a relatively low category need score; and
  if representation of the category in the current distribution is relatively low, generating a relatively high category need score;
generating a link proximity score for the URL, where the link proximity score indicates linking distance from the URL to a linking URL that corresponds to the desired content-based web page type, the linking distance is measured by a number of links between the URL to the linking URL in a linking structure;
calculating a downloading priority for the URL in response to the domain density score, the anchor text score, the URL string score, the category need score, and the link proximity score; and
downloading, in an order determined by the downloading priority, a second web page that corresponds to the URL.

9. A web crawler system comprising:
a computer system comprising a processing unit comprising:
  a web crawler core module configured to download web pages in accordance with a downloading priority scheme;
  a web page classifier coupled to the web crawler core module, the web page classifier being configured to analyze a first web page downloaded by the web crawler core module, the first web page having an outgoing link to a second web page corresponding to a URL; and
  a URL scoring module coupled to the web page classifier and to the web crawler core module, the URL scoring module being configured to assign a downloading priority to the URL based upon a plurality of metrics, wherein the plurality of metrics comprises:
    a domain density metric that results in a domain density score for the URL;
    an anchor text metric that results in an anchor text score for the URL;
    a URL string score metric that results in a URL string score for the URL: and
    a link proximity metric that results in a link proximity score for the URL;
  wherein each of the plurality of metrics indicates a different measure of probability that the second web page is of a designated content type, wherein the designated content type is at least one of commercial product pages, customer reviews pages, news pages, blogs, personal blogs, political pages, sports pages, education pages or reference pages.

10. A web crawler system according to claim 9, wherein the URL scoring module is configured to assign the downloading priority to the URL based upon a category need metric that indicates a predicted category for the second web page.

* * * * *